Figure 1:
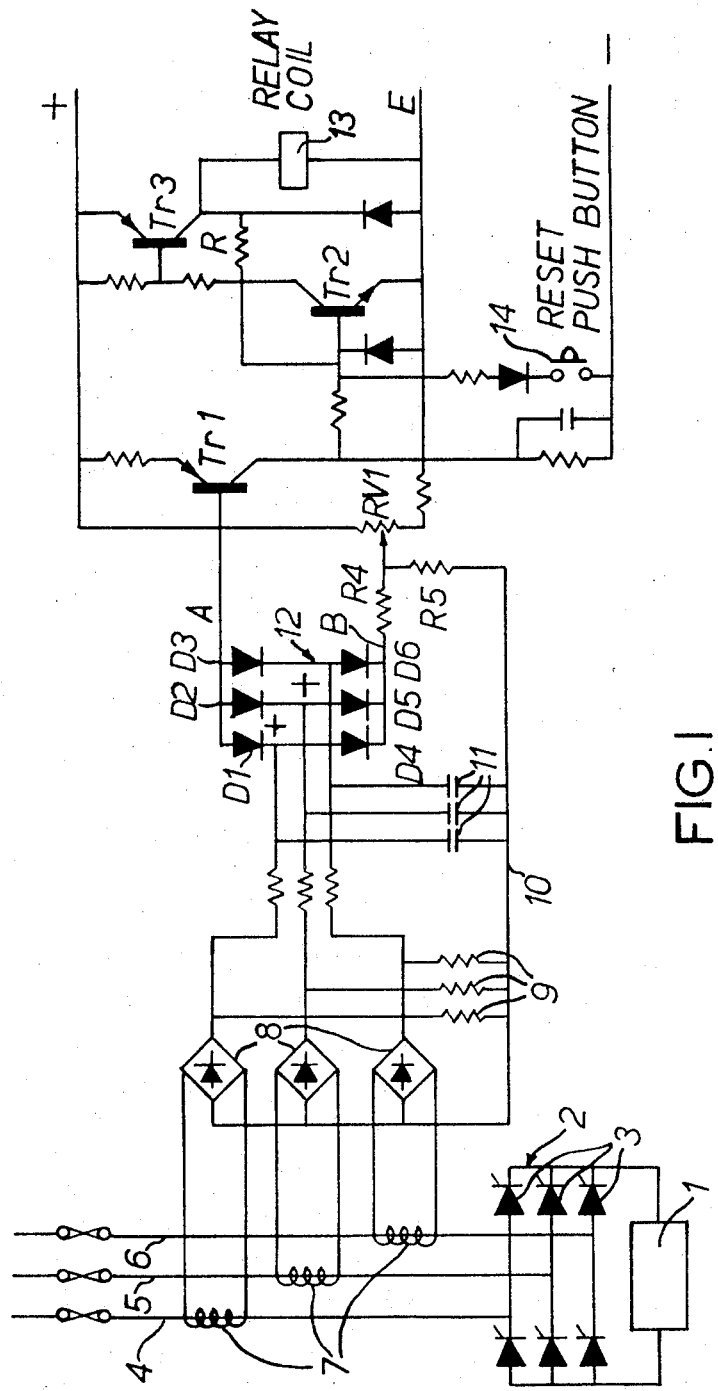

United States Patent Office 3,401,308
Patented Sept. 10, 1968

3,401,308
CIRCUIT ARRANGEMENTS FOR DETECTING PHASE UNBALANCE
James Anthony Darke, Rugby, Warwickshire, England, assignor to Associated Electrical Industries Limited, London, England, a British company
Filed Aug. 29, 1966, Ser. No. 575,780
9 Claims. (Cl. 317—47)

This invention relates to circuit arrangements for detecting electrical unbalance between the phase currents flowing between a polyhase AC supply and a load.

Such circuit arrangements are particularly useful for use with equipment employing a plurality of thyristors and/or semi-conductor diodes, which controls the current supplied to the load from the polyphase AC supply. Equipment of this character inevitably includes a large number of components and hence the possibility of a fault occurring on one or more of the components is high. A fault on many of the components would result in the equipment apparently operating normally while in fact these or other components would be grossly overloaded. It is desirable therefore that some form of monitoring or protection means would be provided which would indicate the presence of local overloads in order that steps may be taken to correct the operation of the equipment before serious damage is caused to any of the semi-conductor components. If conventional monitoring means were provided for indicating a fault in each component in the equipment, the monitoring means would assume elaborate proportions and would be extremely costly to provide. Most faults which could occur in the equipment however would bring about electrical unbalance between the phase currents supplied to the normally balanced load and it is an object of the present invention to provide a circuit arrangement which would detect phase unbalance and thus indicate the likelihood of a fault being present on the equipment.

Accordingly the present invention resides in a circuit arrangement suitable for detecting unbalance between the respective phase currents carried by conductors connected between a polyphase A.C. supply and a load, said arrangement includes for each phase of the supply a current transformer the primary winding of which is energisable by the phase current, a full wave rectifier connected to the secondary winding of the transformer and a resistor connected across the output of the rectifier to serve as a burden to the transformer and a logic circuit having a plurality of input paths one for each phase of the supply, and an output path, and wherein in use the voltage developed across each resistor is smoothed to provide a D.C. signal proportional to the mean value of the phase current, said signals are applied to respective input paths of said logic circuit, and a further D.C. signal is developed at the output path of the logic circuit when there is a difference between any two of the D.C. signals, said further signal being proportional to the difference between the two D.C. signals having the highest and lowest values respectively and means utilising said further signal or a signal derived therefrom to indicate the presence of unbalance between the phase currents.

When the circuit arrangement is in use in conjunction with semi-conductor equipment which controls the current supplied to the load and all the components present in the equipment are functioning correctly the phase currents carried by the conductors are balanced and the D.C. signals developed across the resistors are equal and consequently there is no highest or lowest signals and a further signal is not produced. If, however, a local fault in the equipment causes the phase currents to become unbalanced then D.C. signals applied to the logic circuit are not equal and the further signal is produced.

This signal may be utilised to indicate the presence of unbalance between the phase faults but more usually a signal is derived therefrom which is used to indicate the unbalance as for example by energising a relay which in turn actuates a visual or audible alarm, the signal derived from the further signal may be used to bring about the disconnection of the load from the supply.

In one embodiment of the invention the further signal is amplified and on reaching a predetermined value the amplified further signal operates a transistor switch which causes a relay to be energised. The transistor switch may comprise a bi-stable circuit which is caused to be switched from one stable operating condition to the other when the predetermined value of the amplified further signal is reached, thereby causing a relay to be energised and the relay remains energised until the bi-stable circuit is positively reset under the control of an operator even if the amplified further signal falls below the predetermined value.

In accordance with a still further embodiment of the invention, on reaching a first predetermined value the amplified further signal operates a first transistor switch which causes a first relay to be energised and an aural or visual alarm to be actuated and on reaching a second predetermined value which is higher than the first value an amplified further signal operates a second transistor switch which causes a second relay to be energised and this may bring about the disconnection of the load from the A.C. supply.

In order that the invention may be more readily understood it will now be described, by way of example, with reference to the accompanying drawings which are circuit diagrams showing alternative embodiments of the invention.

Referring to FIG. 1 a load 1 which may be an electric motor is fed with unidirectional current from equipment including a three-phase thyristor rectifier bridge 2. The thyristors 3 constituting the bridge are fired by means of firing circuits (not shown) and the thyristors in each phase of the bridge are energised from the respective phases of a three-phase A.C. supply through three conductors 4, 5 and 6. Current transformer 7 are associated one with each of the conductors 4, 5 and 6 and three fullwave bridge rectifiers 8 are connected one across each secondary winding of the transformers. The positive output terminals of the rectifiers are connected through resistors 9 to a common conductor 10 to which the negative output terminal of each rectifier is connected. The resistors thus act as a burden on the current transformer with which they are associated. Three similar smoothing capacitors 11 are connected one in parallel with each of the resistors 9 and the capacitors are connected to the respective input terminals of a logic circuit shown generally at 12. A smoothing time constant of several cycles is employed so that the instantaneous voltage differences between the input signals and the unbalance produced during rapid current changes are ignored. The logic circuit 12 comprises three circuits each comprising two rectifiers D1, D4; D2, D5; and D3, D6 connected electrically in series with the circuits connected together in shunt and the rectifiers poled in the same direction and the capacitors 11 are connected between the connection between the two rectifiers of the corresponding circuit and the conductor 10 which is connected to the common negative ends of the rectifiers D4, D5 and D6 through resistors R4 and R5.

The operation of the circuit arrangement described so far is as follows:

During normal operation of the load and the equipment supplying the current thereto the current in the three conductors 4, 5 and 6 is balanced and the unidirectional voltages which are applied to the resistors 9 are equal. These voltages are smoothed by the capacitors 11 to give three smooth D.C. voltage signals which are proportional to the phase currents. The logic circuit is only required to operate on steady state unbalance and under normal operating conditions the three voltages applied to the logic circuit are equal. Should a fault however occur on one or other of the components in the equipment including the bridge circuit 2 or the firing circuits of the thyristors 3 so that the phase currents carried by the conductors 4, 5 and 6 are no longer balanced then the D.C. voltages applied to the logic circuit, which are proportional to the phase currents, are no longer equal. The difference between the most positive and the least positive of the signals applied to the logic circuit is developed in the form of a further signal since point A takes up the potential of the lowest positive signal and point B takes up that of the most positive signal.

This further signal or difference signal is applied to a transistor Tr1 acting as an amplifier and the output of Tr1 is fed to a transistor switch in the form of a bi-stable circuit including transistors Tr2 and Tr3. A feed-back resistor R is connected between the base of Tr2 and the collector of Tr3. The bi-stable circuit initially has both Tr2 and Tr3 cut off and when the signal from Tr1 reaches a predetermined value the bi-stable circuit switches to its other operating condition rendering transistor Tr3 conductive thereby causing a relay coil 13 connected in its collector circuit to be energised. The bi-stable circuit remains in this stable operating condition even if the output signal from transistor Tr1 falls below the predetermined value until the bi-stable circuit is positively reset under the control of an operator by closing reset push button 14 which applies a negative signal to the base of transistor Tr2. The value of the amplified further signal which is required to bring about operation of the bi-stable circuit can be adjusted by means of a potentiometer RV1 which is connected in shunt with the transistors Tr2 and Tr3 and the slider is connected to the junction between resistors R4 and R5.

Figure 2:
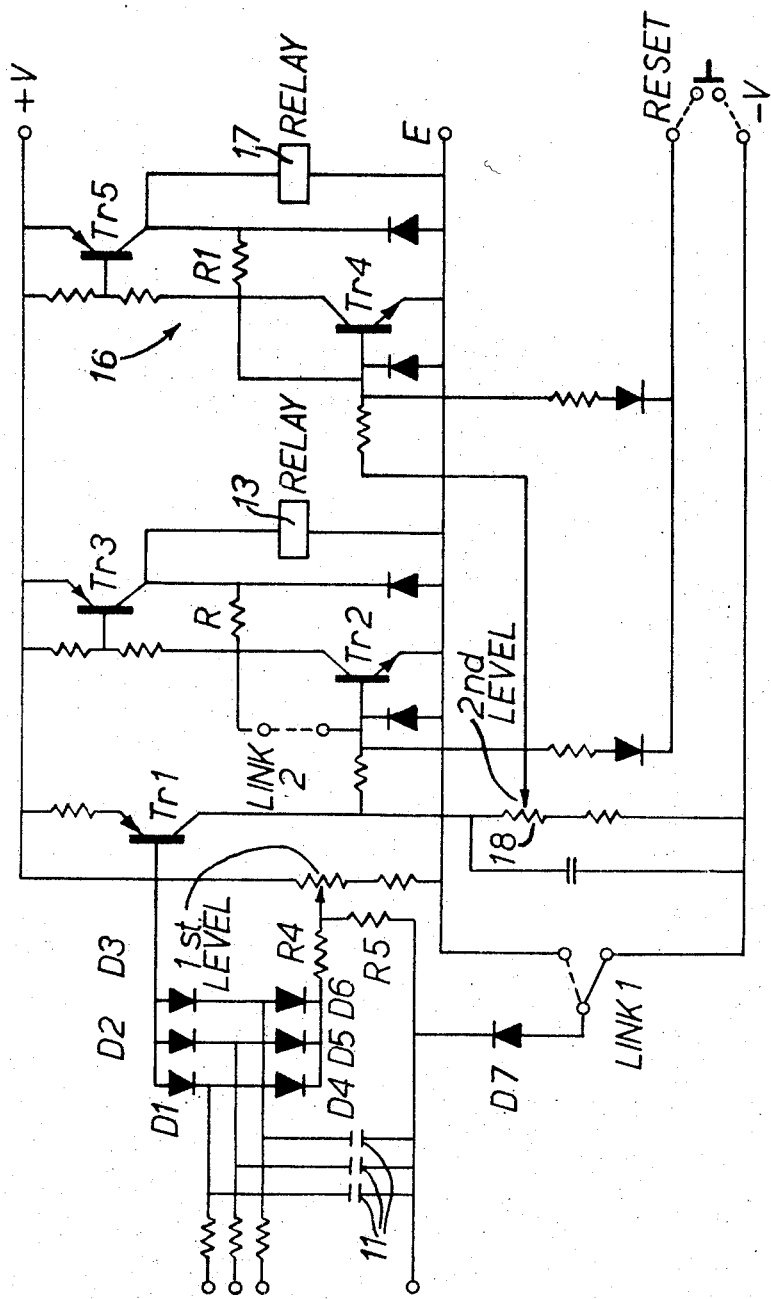

The embodiment of the invention illustrated in FIG. 2 is the same as that shown in FIG. 1 except that a second detector circuit 16 employing transistors Tr4 and Tr5 is provided. This circuit is also a bi-stable circuit and is identical with the circuit constituted by transistors Tr2 and Tr3 and a feed-back resistor R1 between the base of Tr4 and the collector of Tr5 is included and a further relay coil 17 is connected in the collector circuit of transistor Tr5. A potentiometer 18 is connected in the collector circuit of Tr1 and the slider is connected to the base of Tr4. The potentiometer is adjusted so that the second detector operates on a greater degree of unbalance than the circuit constituted by Tr2 and Tr3. Relay 17 is conveniently arranged to disconnect the load 1 from the A.C. supply should the degree of unbalance be sufficient to operate the detector circuit 16.

If desired the feed-back resistor R may be removed so that relay coil 13 drops out if the amplified further signal from transistor Tr1 falls below the predetermined values but the feedback resistor R1 is permanently connected so that relay 17 cannot drop out until the bi-stable circuit is reset manually by push button 19.

Link 1 is normally connected as shown in full lines to connect the negative side of diode D7 to the negative line to ensure that the positive side of D7 cannot be driven more negative than the negative line by the common current transformer signal. This means that the maximum voltage on the capacitors 11 is approximately equal to the difference between the positive and negative lines. The alternative position of link 1 reduces the voltage across the capacitors 11 to the difference between the line voltage and earth and this prevents possible false indication of unbalance under overload conditions. Resistors R4 and R5 serve to modify the operation of the circuit arrangement from an absolute value of unbalance to a more desirable percentage of unbalance.

What I claim is:

1. An electric circuit arrangement suitable for detecting unbalance between the respective phase currents carried by conductors connected between a polyphase A.C. supply and a load, said arrangement including for each resistor is smoothed to provide a D.C. signal proportional mary winding of which is energisable by the phase current, a full wave rectifier connected to the secondary winding of the transformer and a resistor connected across the output of the rectifier to serve as a burden to the transformer and a logic circuit having a plurality of input paths one for each phase of the supply, and an output path, and wherein in use the voltage developed across each resistor is smoothed to provide a D.C. signal proportional to the mean value of the phase current, said signals are applied to respective input paths of said logic circuit, and a further D.C. signal is developed at the output path of the logic circuit when there is a difference between any two of the D.C. signals, said further signal being proportional to the difference between the two D.C. signals having the highest and lowest values respectively and means utilising said further signal or a signal derived therefrom to indicate the presence of unbalance between the phase currents.

2. An electric circuit arrangement as claimed in claim 1, in which means are provided by which said further signal or a signal derived therefrom, on reaching a predetermined value is caused to actuate a relay and provide aural or visual indication of the presence of unbalance between the phase currents.

3. An electric circuit arrangement as claimed in claim 2, in which means are provided for amplifying said further signal and on reaching a predetermined value said amplified further signal operates a transistor switch which causes said relay to be energised and an aural or visual alarm to be actuated.

4. An electric circuit arrangement as claimed in claim 2, in which means are provided for amplifying said further signal and on reaching a predetermined value said amplified further signal causes a bi-stable circuit to switch from one stable operating condition to the other thereby causing the relay to be energised, said relay remaining energised until the bi-stable circuit is positively reset even if said amplified further signal reduces below said predetermined value.

5. An electric circuit arrangement as claimed in claim 4, in which said bi-stable circuit comprises a two stage transistor amplifier having a feed-back path provided between the two stages and means are provided for resetting the bi-stable circuit by applying a suitable potential to the base of the first stage transistor under the control of an operator.

6. An electric circuit arrangement as claimed in claim 2, in which means are provided for amplifying said further signal and on reaching a first predetermined value said amplified further signal operates a first transistor switch which causes a first relay to be energised and an aural or visual alarm to be actuated, and on reaching a second predetermined value higher than said first value said amplified further signal operates a second transistor switch which causes a second relay to be energised.

7. An electric circuit arrangement as claimed in claim 6, in which means are provided which on said second relay being energised bring about the disconnection of the load from said polyphase A.C. supply.

8. An electric circuit arrangement as claimed in claim 6 in which said first and second transistor switches are transistorised bi-stable circuits.

9. An electric circuit arrangement as claimed in claim 1, in which the logic circuit comprises for each phase of the supply a circuit comprising two rectifiers connected electrically in series with the circuits connected in shunt with the rectifiers poled in the same direction, and the input path to each circuit connected to the connection between the two rectifiers of that circuit.

References Cited

UNITED STATES PATENTS

| | | | |
|---|---|---|---|
| 2,858,457 | 10/1958 | Epstein et al. | 317—47 X |
| 3,317,791 | 5/1967 | Price et al. | 317—22 |
| 3,331,989 | 7/1967 | Schmidt et al. | 317—47 X |
| 3,337,772 | 8/1967 | Andersson | 317—47 X |

LEE T. HIX, *Primary Examiner.*

J. D. TRAMMELL, *Assistant Examiner.*